United States Patent
Noles, Jr.

(10) Patent No.: US 10,494,269 B2
(45) Date of Patent: *Dec. 3, 2019

(54) TREATMENT OF PRODUCED WATER FROM A SUBTERRANEAN FORMATION

(71) Applicant: Noles Intellectual Properties, LLC, Washington, OK (US)

(72) Inventor: Jerry W. Noles, Jr., Blanchard, OK (US)

(73) Assignee: Noles Intellectual Properties, LLC, Washington, OK (US)

(*) Notice: Subject to any disclaimer, the term of this patent is extended or adjusted under 35 U.S.C. 154(b) by 92 days.

This patent is subject to a terminal disclaimer.

(21) Appl. No.: 15/394,623

(22) Filed: Dec. 29, 2016

(65) Prior Publication Data
US 2018/0186658 A1 Jul. 5, 2018

(51) Int. Cl.
*C02F 1/12* (2006.01)
*B01D 1/18* (2006.01)
*B01D 1/14* (2006.01)
*C02F 1/04* (2006.01)
*C02F 1/10* (2006.01)
*B01D 1/16* (2006.01)

(52) U.S. Cl.
CPC ............... *C02F 1/12* (2013.01); *B01D 1/14* (2013.01); *B01D 1/16* (2013.01); *B01D 1/18* (2013.01); *C02F 1/043* (2013.01); *C02F 1/048* (2013.01); *C02F 1/10* (2013.01); *C02F 2201/008* (2013.01)

(58) Field of Classification Search
CPC ........ B01D 1/14–20; C02F 1/048; C02F 1/10; C02F 1/12
See application file for complete search history.

(56) References Cited

U.S. PATENT DOCUMENTS

| | | | | |
|---|---|---|---|---|
| 2001/0040135 A1* | 11/2001 | Taira | .................. | C02F 1/725 210/763 |
| 2011/0140457 A1* | 6/2011 | Lakatos | .................. | B01D 1/14 290/1 R |
| 2013/0037223 A1* | 2/2013 | Duesel, Jr. | .................. | B01D 1/14 159/4.01 |

\* cited by examiner

*Primary Examiner* — Renee Robinson

(57) ABSTRACT

Systems for water treatment may include a drying tunnel, wherein the drying tunnel may comprise: a blower, wherein the blower may be fluidly coupled to an end of the drying tunnel; a heater coupled to an exterior surface of the drying tunnel; nozzles disposed between the heater and the blower; and a chamber configured to collect solids; wherein the drying tunnel may be configured to evaporate water.

20 Claims, 4 Drawing Sheets

TREATMENT OF PRODUCED WATER FROM A SUBTERRANEAN FORMATION

BACKGROUND

Within recent years, the oil and gas industry has developed the use of hydraulic fracturing to produce what was once considered nonproductive oil and gas formations. This hydraulic fracturing technology may require the use of high volumes of water to be pumped into subterranean wells under tremendous rates and pressures to pry rock apart, thereby allowing the oil and gas that is trapped within the matrix of the oil and gas formations to migrate to the wellbore and production casing. Although the use of this technology may have allowed high volumes of oil and gas recovery from the oil and gas formations, the use of these large volumes of water has been widely scrutinized. Because the water that may be used during these fracturing operations is preferably clean and free from contaminants, current technologies may use fresh water sources that may normally be used for irrigation and human consumption. The use of these fresh water supplies may have an impact on the availability of fresh water for human consumption and irrigation.

Although the water that may be pumped into the oil and gas formations may be recovered over the production life of the oil and gas well, the water may become contaminated with chemicals from the fracturing process and minerals that are leached from the producing reservoir during the production of the well. Many oil and gas reservoirs may have been created from decomposed organic matter generated from oceanic sea beds. Fresh water may mix with the salt water that may typically be produced from the hydrocarbon formations making both the frac water and the formation water unsuitable for human consumption or reuse for hydraulic fracturing. This water that may be produced or that flows back from the well may then be disposed of by pumping it into deep nonproductive oil and gas formations. This cycle may be repeated for each well and may use hundreds of thousands of barrels for each operation.

Recently this disposal process has come under scrutiny due to increased seismic activity that has occurred in conjunction with the pumping of the water into these subterranean reservoirs. It is for this reason that the industry has an increased need to find a way to reduce the amount of water that may be disposed of in these underground formations. The volume of water and the high level of the Total Dissolved Solids ("TDS") may make it difficult to filter using a Reverse Osmosis unit for surface discharge purposes. In the past, distillation systems may have been used to evaporate and condense the water for discharge purposes. However, the cost for the energy or BTUs to distill the water proved to often be uneconomical to use on a large scale basis.

In another instance, evaporation processes may have been used to eliminate the water and recover the solids contained in the water. These systems may spray large volumes of water into the air using blowers and misting systems to evaporate the water. The solids may then fall into collection or evaporation pits. This process may be problematic due to wind causing the solids or salt to be blown outside of the evaporation pits or collection areas. This may then be compensated by the use of wind walls to prevent the drifting of the sprayed/misted water. These wind walls may generate static areas of high humidity air masses, thereby reducing the efficiencies of the evaporation process. In the past, this may have been compensated for by setting up wind sensors that would turn blowers on and off on different sides of the evaporation pits to compensate for wind direction.

In another instance, an enclosure may be placed over the entire evaporation pit to prevent drift caused by the wind. In this case, the enclosure may be ventilated to continuously move air into and out of the enclosure to avoid saturation of the air mass.

Therefore, there may exist a need for a system to evaporate and/or reduce the volumes of water that are being disposed of without the issues of containment that are generated by blowing high solids water into the atmosphere, and allowing them to fall into collection or evaporation pits.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
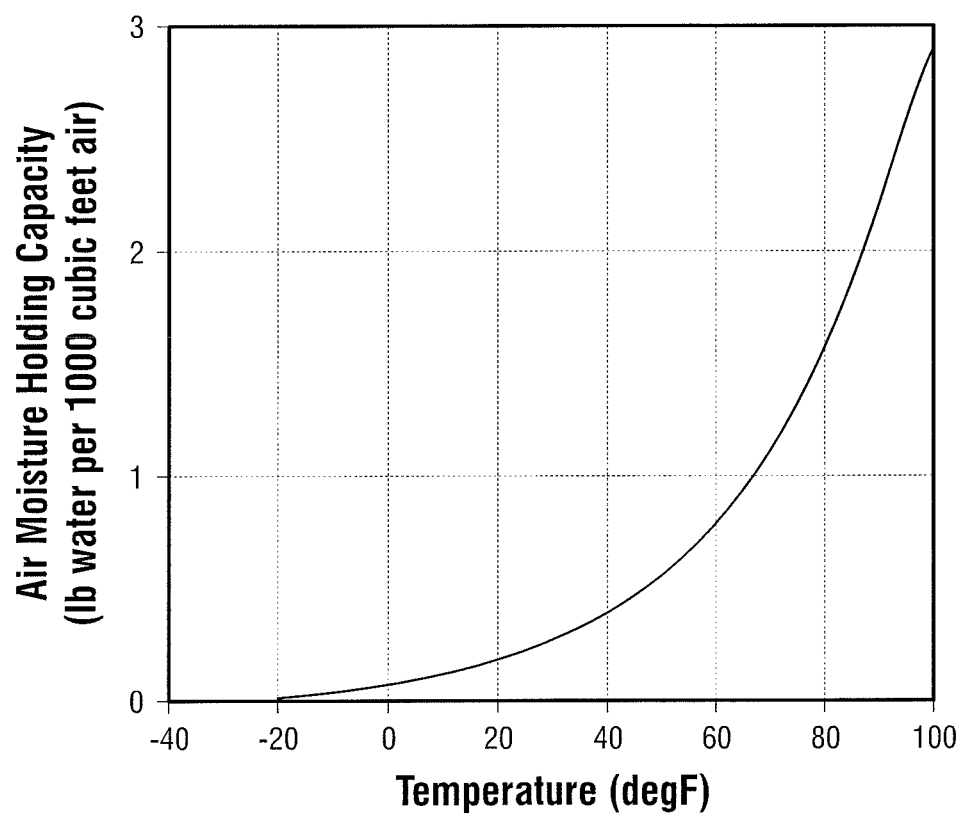
FIG. 1 illustrates a chart showing volumetric air requirements for evaporation based on the temperature of the air mass.

Water may exist naturally in subterranean formations and may be produced in conjunction with hydrocarbons from the subterranean formations. Water may also be injected into a subterranean formation to stimulate hydrocarbon production (e.g., hydraulic fracturing or fracking). When the water is produced from the subterranean formations, it may comprise amounts of dissolved salts and other substances, which may make it unsuitable for agriculture and human consumption.

The present disclosure may generally relate to the treatment of contaminated water (e.g. salt water/brine), and more specifically to the evaporation of water produced from a subterranean formation. Embodiments of the present disclosure may include mechanical agitation with submerged aeration to saturate an air mass, thereby accelerating the evaporation process, without generating the environmental concerns of high TDS fluids being carried outside of the evaporation zone. Brine may comprise a brine solution comprising at least 10 wt % NaCl. In some embodiments, brine may comprise a brine solution comprising about 10 wt % NaCl to about 25 wt % NaCl. In other embodiments, brine may comprise a brine solution comprising more than 25 wt % NaCl. Other ranges may include ranges above what may be considered dischargeable to surface ground waters. As the water becomes concentrated and saturated with salts, the heavier water may be pulled off and then injected into subterranean disposal wells at significantly lower volumes then normal, thereby reducing the subsurface pressurization and aiding in prevention of seismic occurrences.

By allowing air to be mixed and released below the water surface, the air mass may become saturated before it breaks the surface of the water. Systems, methods and devices of the present disclosure may substantially improve the evaporation efficiency of the water by allowing the air mass temperature to rise to the temperature of the water contained in a pit that the air mass is in contact with, which may be above the temperature of the air mass above the pit. This may be important during winter months where the air mass temperatures within certain regions may be below 30° F. Systems, methods and devices of the present disclosure may also allow for high rates of oxygen transfer due to the high volumes of air (e.g., 100,000 cubic feet of air per minute) that may be moved. By increasing the air that may be in contact with the water, the amount of dissolved oxygen may be increased. Standard aeration systems may use as much as 1,500 horsepower to move 5,000 cubic feet of air per minute. Of this 5,000 cfm, only a small percentage of the air mass may go into solution in the form of dissolved oxygen. This may typically be around 2% of the oxygen that is within the air mass, which may render the system 98% inefficient. To overcome these inefficiencies, higher volumes of air may be moved at lower horsepower ("HP"). In comparison, a 50 HP axial fan may move 100,000 cubic feet per minute ("cfm"), thereby increasing the amount of dissolved oxygen per horsepower by more than 30 times. In the past, aeration systems have relied on moving air (e.g., an air mass) into water in order to infuse oxygen into the water or setting up blowers that would feed headers, and the headers would then feed control lines that went into the water at various depths to feed diffusers or other mechanisms to distribute the air into the water. Systems, methods and devices of the present disclosure may eliminate the need for headers or control lines to distribute the air into the water.

In certain embodiments, flow back and/or produced water may be pumped or hauled into a storage pit or storage reservoir via trucks or other gathering systems. Blowers may be placed into the pit and spaced based on volumetric requirements for evaporation or for aeration purposes.

FIG. 1 illustrates a chart showing volumetric air requirements for evaporation based on the temperature of the air mass. It should be noted that the number of pounds of water that may be evaporated per 1,000 cubic feet of air may be highly dependent on the initial relative humidity of the air mass and the temperature of the air. This relative humidity may fluctuate during the course of the day. Therefore, systems, methods and devices of the present disclosure may include programs configured to turn on systems and devices of the present disclosure during low relative humidity times of about 30% to about 70%, thereby lowering the cost of energy and improving the efficiencies of a vapor transfer. For example, if the number of pounds of water per 1,000 cubic feet of air is 1, and the relative humidity is 70%, then the pounds of water that the 1,000 cubic feet may be capable of absorbing before becoming saturated or reaching 100% relative humidity may be 0.30 or 30% of the 1 pound per thousand cubic feet. Therefore, a blower that may move 10,000 cubic feet per minute may be capable of evaporating about 3 pounds of water per minute at an initial air mass relative humidity of 70%. However, at an initial relative humidity of 30%, about 7 pounds of water per minute may be evaporated. Based on this calculation, the average annual relative humidity may be used to calculate the number of evaporation devices and the size of the evaporation devices to achieve a certain volume of evaporation per day. The moisture holding capacity of air may be 1 lb of water per 1,000 cubic feet of dry air. The moisture holding capacity of air at 100° F. may be about 10 times the moisture holding capacity of air at 30° F. This may be an important observation, especially when working in areas where air temperatures may be low during certain times of the year.

Figure 2:
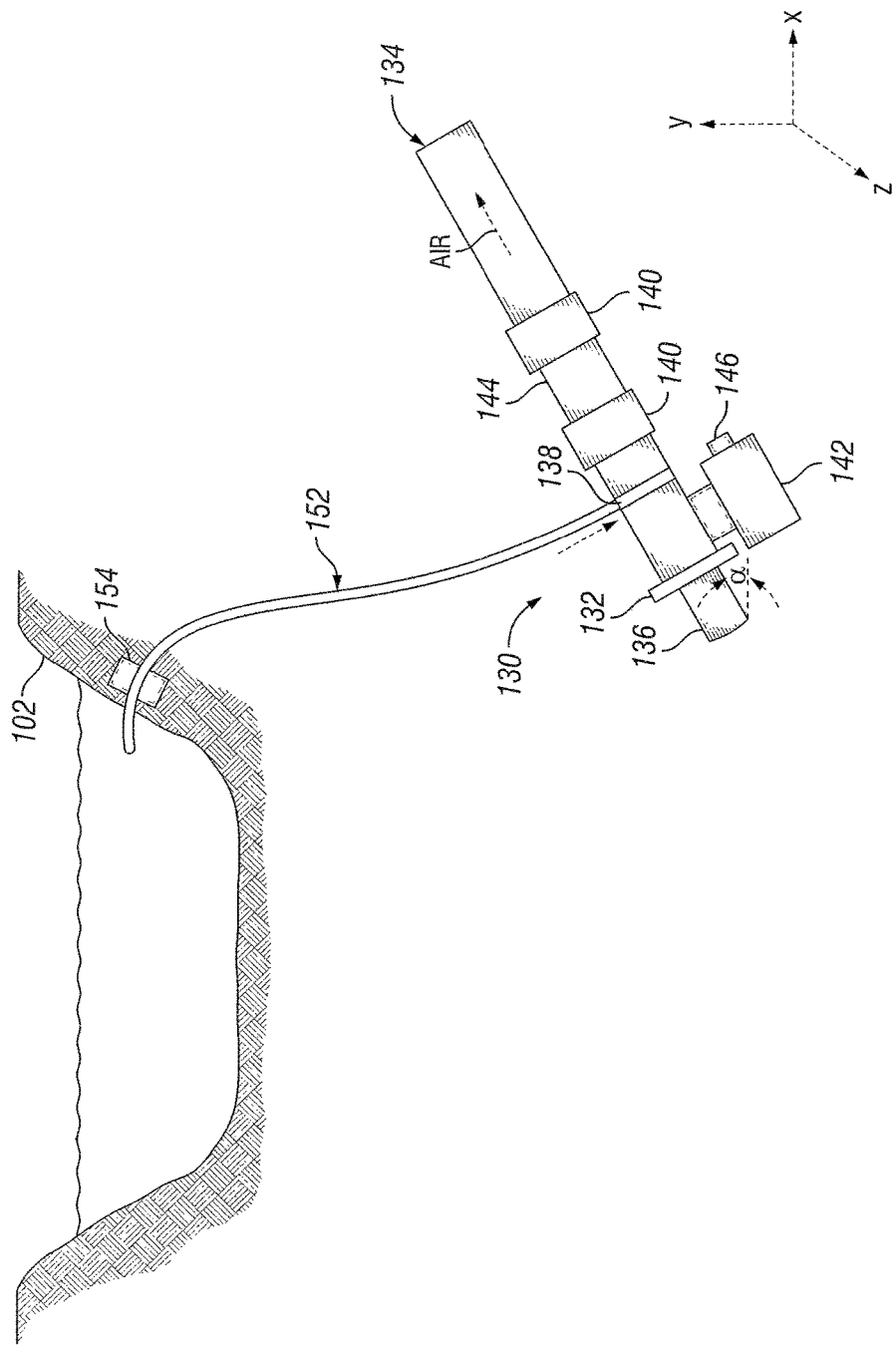
FIG. 2 illustrates a drying tunnel in accordance with embodiments of the present disclosure.

As shown in FIG. 2, in some embodiments, water from storage pit 102, which may include brine, may be pumped to a drying tunnel or evaporator and collection tunnel where additional air may be pumped into the evaporation tunnel while the water is sprayed into the air mass within the drying tunnel. Brine may comprise a brine solution comprising at least 10 wt % NaCl. In some embodiments, brine may comprise a brine solution comprising about 10 wt % NaCl to about 25 wt % NaCl. In other embodiments, brine may comprise a brine solution comprising more than 25 wt % NaCl. Other ranges may include ranges above what may be considered dischargeable to surface ground waters. As the water becomes concentrated and saturated with salts, the heavier water may be pulled off and then injected into subterranean disposal wells at significantly lower volumes then normal, thereby reducing the subsurface pressurization and aiding in prevention of seismic occurrences.

FIG. 2 illustrates tunnel 130 (e.g., a drying tunnel). Tunnel 130 may be a hollow conduit or recess. Tunnel 130 may be utilized in combination with the evaporation unit(s) disclosed in co-pending U.S. patent application Ser. Nos. 15/394,612 and 15/394,627 or tunnel 130 may be utilized by itself. Tunnel 130 may include proximal end 132 and distal end 134. Distal end 134 may be open to the atmosphere. Tunnel 130 may include a shape of a drum or barrel. Tunnel 130 may comprise blower 136, nozzles 138, heaters 140 and a chamber 142 (e.g., a solids collection chamber). Tunnel 130 may be positioned at an inclination angle, $\alpha$, from about 10 to about 90° relative to horizontal (e.g., x axis, as shown). Alternatively, inclination angle, $\alpha$, may be about 30° to about 90°, or about 40° to about 50° (e.g., 45°). Tunnel 130 may be of a sufficient size and inner diameter and may be heated to prevent any carry over of the air mass. Tunnel 130 may include an inner diameter of about 8 feet to about 12 feet and a length of about 50 feet to about 200 feet. Tunnel 130 may be made of any suitable material, such as, for example, metal (e.g., steel, alloys).

Blower 136 may be fluidly coupled to proximal end 132 by any suitable means, such as, welds. Blower 136 may include a high volume blower and may move over 100,000 cubic feet of air per minute. In certain embodiments, blower 136 may move about 10,000 cubic feet of air per minute to about 500,000 cubic feet of air per minute. The inner diameter of blower 136 may be about 12 inches to about 96 inches. Blower 136 may be electrically powered and may include a motor rated from about 7 horsepower to about 150 horsepower. Blower 136 may also be powered by any other suitable means. Blower 136 may include ducted fans. Blower 136 may be placed at the lower end of tunnel 130 (e.g., proximal end 132) with a collection point (e.g., chamber 142) for the solids above the blower 136. Blower 136 may move over 100,000 cubic feet of air per minute. In certain embodiments, blower 136 may move about 10,000 cubic feet of air per minute to about 100,000 cubic feet of air per minute. Blower 136 may aid in evaporating the water within tunnel 130. Blower 136 may be electrically powered and may include a motor rated from about 7 horsepower to about 150 horsepower. Blower 136 may have an inner diameter from about 8 feet to about 12 feet.

Nozzles 138 may be disposed between the blower 136 and heaters 140. Nozzles 138 may be nozzles used in misting and evaporation systems. In some embodiments, nozzles 138 may include a plurality of 32 nozzles that may spray about 30 gallons per minute into the tunnel 130 with an air temperature of about 100° F. and an air rate of about 100,000 cfm. Based on the evaporation chart, the air mass at that temperature may be capable of holding about 300 lbs of water per min, or absorbing about 30 gallons per minute of water. The rate of water exiting the nozzles 138 may be adjusted to compensate for the influent air temperature to reach full evaporation. Nozzles 138 may be fluidly coupled to storage pit 102 (e.g., via line 152 and pump 154). Storage pit 102 may supply nozzles 138 with water. Nozzles 138 may be configured to spray water (e.g., water from storage pit 102) into tunnel 130.

Heaters 140 (e.g., electrically powered heaters) may include band heaters and/or direct contact heaters. Any other suitable heaters may be utilized. Heaters 140 may be incorporated on the outside surface 144 of tunnel 130 to heat the air mass and improve the vaporization exchange into the air mass. The heating temperatures may range from about 70° F. on cold days to over about 130° F. on hot summer days. Heaters 140 may aid in evaporating the water within tunnel 130.

Chamber 142 may be disposed between blower 136 and nozzles 138. Chamber 142 may be configured to receive/collect solids falling out of (e.g., separating from) the water as the water evaporates within tunnel 130. Chamber 142 may include an auger 146 for removing solids from chamber 142. Chamber 142 may have a diameter from about 8 inches to about 10 inches or more. Auger 146 may be of about the same diameter of chamber 142.

Figure 3:
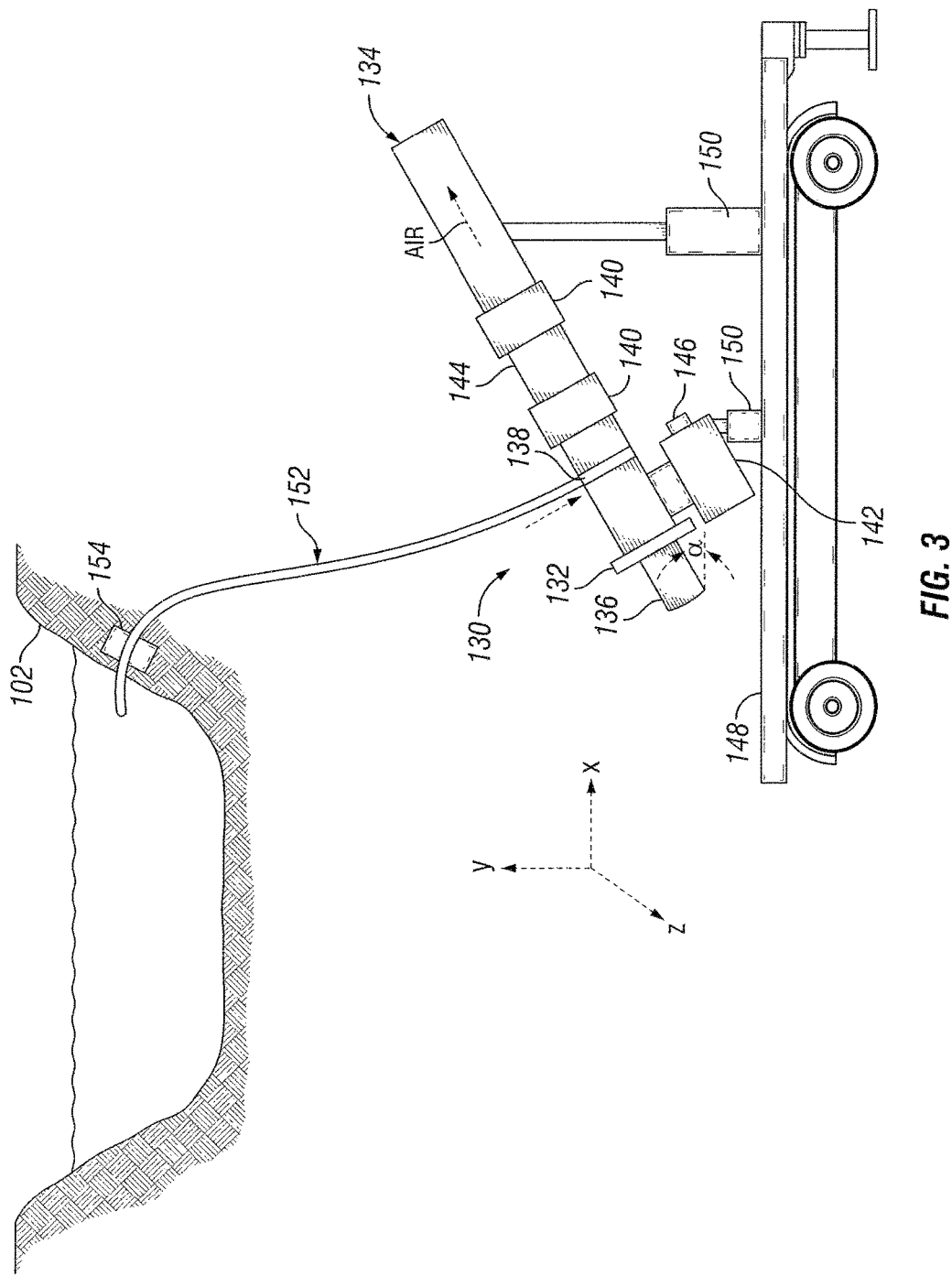
FIG. 3 illustrates a drying tunnel positioned on a vehicle trailer in accordance with embodiments of the present disclosure.
Figure 4:
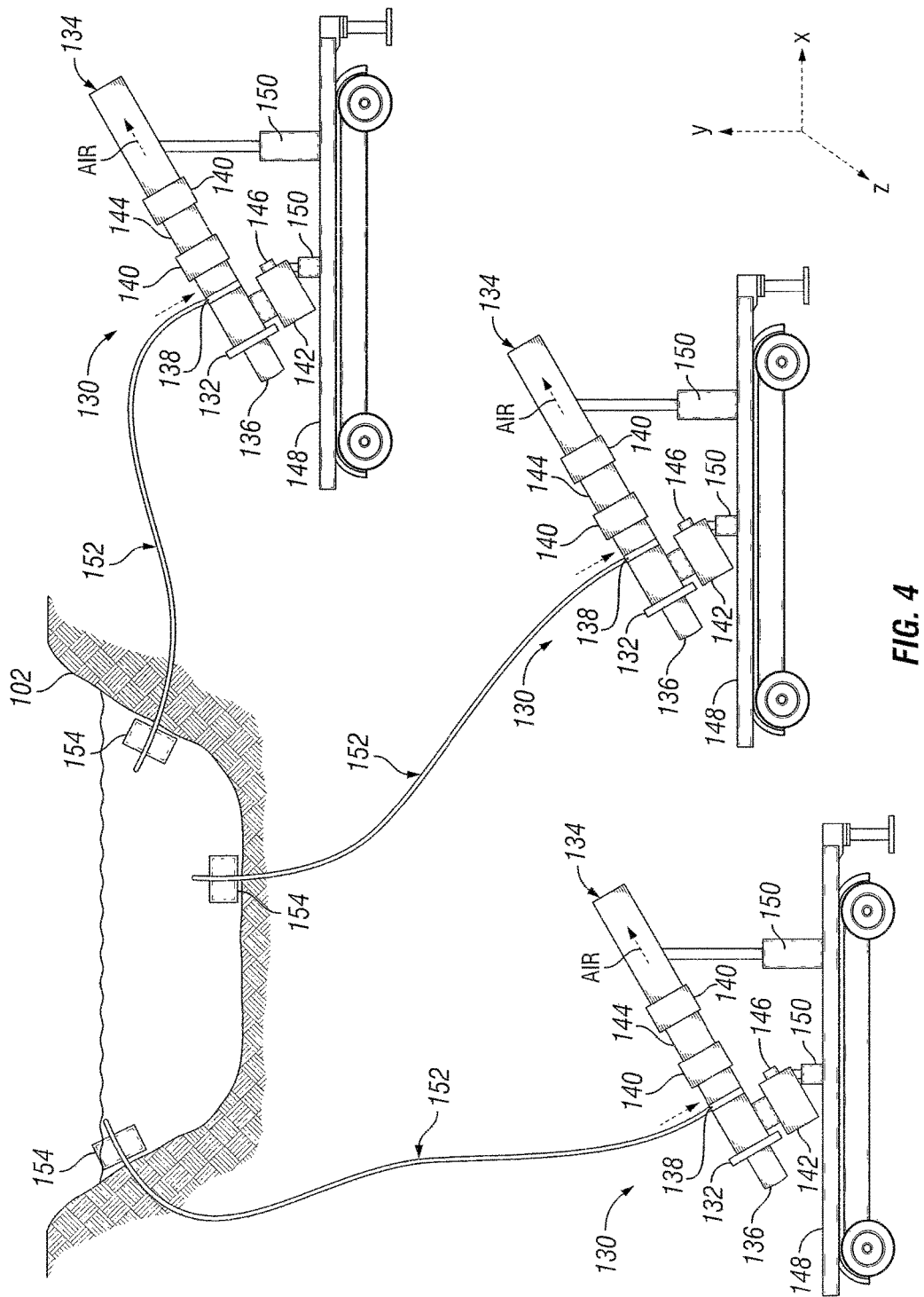
FIG. 4 illustrates a plurality of drying tunnels positioned on vehicle trailers in accordance with embodiments of the present disclosure.

In certain embodiments, tunnel 130 may be positioned on a trailer (e.g., vehicle trailer). FIG. 3 illustrates tunnel 130 positioned on trailer 148. Tunnel 130 may be coupled to trailer 148 via lifters 150 (e.g., hydraulic lifters—lifters actuated via fluid). Lifters 150 may lower and/or raise tunnel 130, thereby adjusting an inclination angle (e.g., α) relative to horizontal (e.g., x axis, as shown). Although FIG. 3 illustrates a single tunnel 130 and trailer 148, it should be noted that a plurality of tunnels 130 and trailers 148 may be utilized, as illustrated on FIG. 4.

During operation of tunnel 130, water from storage pit 102 may be pumped to nozzles 138. Nozzles 138 may spray water from storage pit 102 into the interior of tunnel 130. The nozzles 138 may spray at a rate below the absorption rate of the air mass. Blower 136 may capture air from the surrounding area and blow/force the air through tunnel 130 and out distal end 134 as heaters 140 heat the air and water mixture. As the water evaporates, the solids in the water (e.g., salt) may fall out of the water and gravitationally move to the bottom of the angled tunnel 130 where they are collected in chamber 142. The solids in chamber 142 may be augured and transported for recycling or disposal. Tunnel 130 may be scraped to prevent buildup of salts inside of the inner surface of tunnel 130. The scraping may be accomplished by any suitable means.

In certain embodiments, a drying tunnel may comprise a blower, wherein the blower may be fluidly coupled to an end of the drying tunnel; a heater coupled to an exterior surface of the drying tunnel; nozzles disposed between the heater the blower; and a chamber configured to collect solids; wherein the drying tunnel may be configured to evaporate water. The blower may be configured to move over 100,000 cubic feet of air per minute. The drying tunnel may be positioned at angle from about 30° to about 90° relative to horizontal.

In other embodiments, a system may comprise a plurality of drying tunnels, wherein each drying tunnel may comprise a blower, wherein the blower may be fluidly coupled to an end of the drying tunnel; a heater coupled to an exterior surface of the drying tunnel; nozzles disposed between the heater and the blower; a chamber configured to collect solids; and wherein the drying tunnel is configured to evaporate water. The blower may be configured to move over 100,000 cubic feet of air per minute. The plurality of drying tunnels may be positioned at angle from about 30° to about 90° relative to horizontal.

In some embodiments, a method may comprise supplying water from a body of water to a drying tunnel, wherein the drying tunnel may comprise a blower, wherein the blower may be fluidly coupled to an end of the drying tunnel; a heater coupled to an exterior surface of the drying tunnel; nozzles disposed between the heater and the blower; a chamber configured to collect solids; and wherein the drying tunnel may be configured to evaporate the water. The method may further comprise spraying the water into the drying tunnel with the nozzles; capturing and blowing air into the drying tunnel with the blower; heating the water with the heater; evaporating the water; and collecting solids from the water in the chamber. The blower may be configured to move over 100,000 cubic feet of air per minute. The drying tunnel may be positioned at angle from about 30° to about 90° relative to horizontal.

It is believed that the operation and construction of the present disclosure will be apparent from the foregoing description. While the apparatus and methods shown or described above have been characterized as being preferred, various changes and modifications may be made therein without departing from the spirit and scope of the disclosure as defined in the following claims.

What is claimed is:

1. A drying tunnel for evaporating and treating contaminated water comprising:
   a hollow conduit with a proximal end and a distal end spaced apart from the proximal end;
   a blower fluidly coupled to the proximal end of the drying tunnel and configured to provide a stream of air into the drying tunnel;
   a heater coupled the drying tunnel;
   at least one nozzle configured to be a coupled to a source of contaminated water, the at least one nozzle disposed between the heater and the blower and configured to provide the contaminated water into the drying tunnel and the stream of air passing therethrough; and,
   a chamber coupled to and disposed exterior to the drying tunnel, the chamber configured to collect solids falling out of solution from the contaminated water as the contaminated water is evaporated.

2. The drying tunnel of claim 1, wherein the blower is configured to move over 100,000 cubic feet of air per minute.

3. The drying tunnel of claim 1, wherein at least one of the blower and the drying tunnel has an inner diameter from about 8 feet to about 12 feet.

4. The drying tunnel of claim 1, wherein a length of the drying tunnel is about 50 feet to about 200 feet.

5. The drying tunnel of claim 1, wherein the drying tunnel is disposed on a trailer.

6. The drying tunnel of claim 1, wherein the chamber is positioned between the blower and the at least one nozzle.

7. The drying tunnel of claim 1, wherein the drying tunnel is positioned at an angle from about 30° to about 90° relative to horizontal.

8. A system for evaporating and treating contaminated water comprising:
   a plurality of drying tunnels, wherein each drying tunnel of the plurality of drying tunnels comprises:
      a hollow conduit with a proximal end and a distal end spaced apart from the proximal end;
      a blower fluidly coupled to the proximal end of the drying tunnel and configured to provide a stream of air into the drying tunnel;
      a heater coupled the drying tunnel;

at least one nozzle configured to be a coupled to a source of contaminated water, the at least one nozzle disposed between the heater and the blower and configured to provide the contaminated water into the drying tunnel and the stream of air passing therethrough; and, a chamber coupled to and disposed exterior to the drying tunnel, the chamber configured to collect solids falling out of solution from the contaminated water as the contaminated water is evaporated.

9. The system of claim 8, wherein the blower is configured to move over 100,000 cubic feet of air per minute.

10. The system of claim 8, wherein at least one of the blower and at least one of the plurality of drying tunnels has an inner diameter from about 8 feet to about 12 feet.

11. The system of claim 8, wherein a length of at least one of the plurality of drying tunnels is about 50 feet to about 200 feet.

12. The system of claim 8, wherein at least one of the plurality of drying tunnels is disposed on a trailer.

13. The system of claim 8, wherein the chamber is positioned between the blower and the at least one nozzle.

14. The system of claim 8, wherein at least one of the plurality of drying tunnels is positioned at an angle from about 30° to about 90° relative to horizontal.

15. A method for evaporating and treating contaminated water comprising:

supplying contaminated water to at least one drying tunnel, wherein the at least one drying tunnel comprises:

a hollow conduit with a proximal end and a distal end spaced apart from the proximal end;

a blower fluidly coupled to the proximal end of the at least one drying tunnel and configured to provide a stream of air into the at least one drying tunnel;

a heater coupled the at least one drying tunnel;

at least one nozzle configured to be a coupled to a source of contaminated water, the at least one nozzle disposed between the heater and the blower and configured to provide the contaminated water into the at least one drying tunnel and the stream of air passing therethrough; and, a chamber coupled to and disposed exterior to the at least one drying tunnel, the chamber configured to collect solids falling out of solution from the contaminated water as the contaminated water is evaporated;

spraying the contaminated water into the at least one drying tunnel with the at least one nozzle;

blowing air into the at least one drying tunnel with the blower;

heating the contaminated water sprayed into the at least one drying tunnel with the heater;

evaporating the water; and collecting solids falling out of solution from the contaminated water in the chamber as the contaminated water is evaporated.

16. The method of claim 15, wherein the blower is configured to move over 100,000 cubic feet of air per minute.

17. The method of claim 15, wherein at least one of the blower the at least one drying tunnel has an inner diameter from about 8 feet to about 12 feet.

18. The method of claim 15, wherein a length of the drying tunnel is about 50 feet to about 200 feet.

19. The method of claim 15, wherein the drying tunnel is positioned on a trailer.

20. The method of claim 15, wherein the drying tunnel is positioned at an angle from about 30° to about 90° relative to horizontal.

* * * * *